United States Patent [19]

Edwards

[11] Patent Number: 5,035,239

[45] Date of Patent: Jul. 30, 1991

[54] POWERED RESPIRATORS

[75] Inventor: David B. Edwards, Harrow, England

[73] Assignee: Racal Safety Limited, England

[21] Appl. No.: 370,217

[22] Filed: Jun. 22, 1989

[30] Foreign Application Priority Data

Jun. 25, 1988 [GB] United Kingdom ............... 8815179

[51] Int. Cl.$^5$ ............................................. A62B 7/00
[52] U.S. Cl. ......................... 128/205.23; 128/201.24;
128/200.28
[58] Field of Search .................... 128/201.24, 201.25,
128/202.22, 205.23, 204.21, 204.23, 724, 200.28

[56] References Cited

U.S. PATENT DOCUMENTS

| | | | |
|---|---|---|---|
| 3,580,082 | 5/1971 | Strack | 73/705 |
| 3,590,640 | 7/1971 | Cindrich | 73/705 |
| 3,765,239 | 10/1973 | Olsson | 128/205.23 |
| 4,176,617 | 12/1979 | Pilipski | 128/202.22 |
| 4,286,589 | 9/1981 | Thompson | 128/202.22 |
| 4,322,978 | 4/1982 | Fromm | 73/705 |
| 4,322,979 | 4/1982 | Fromm | 73/705 |
| 4,464,936 | 8/1984 | McIntire et al. | 73/705 |
| 4,501,293 | 2/1985 | Furlong et al. | 128/205.23 |
| 4,598,279 | 7/1986 | Nowacki et al. | 128/202.22 |
| 4,674,492 | 6/1987 | Niemeyer | 128/202.22 |
| 4,765,326 | 8/1988 | Pieper | 128/202.22 |
| 4,803,471 | 2/1989 | Rowland | 128/202.22 |
| 4,825,802 | 5/1989 | Le Bec | 128/202.22 |
| 4,848,332 | 7/1989 | Champain | 128/204.21 |

FOREIGN PATENT DOCUMENTS

| | | |
|---|---|---|
| 0196784 | 10/1986 | European Pat. Off. . |
| 2450080 | 4/1976 | Fed. Rep. of Germany . |
| 53-21972 | 2/1978 | Japan . |
| 53-77571 | 7/1978 | Japan . |
| 56-129830 | 12/1981 | Japan . |
| 57-30921 | 2/1982 | Japan . |
| 57-131032 | 8/1982 | Japan . |
| 1501857 | 4/1975 | United Kingdom . |
| 1495020 | 12/1977 | United Kingdom . |
| 2032284 | 5/1980 | United Kingdom . |
| 2043239 | 10/1980 | United Kingdom . |
| 2086572 | 5/1982 | United Kingdom . |
| 2115548 | 9/1983 | United Kingdom . |
| 2130893 | 6/1984 | United Kingdom . |

Primary Examiner—Aaron J. Lewis
Attorney, Agent, or Firm—Jerry A. Miller

[57] ABSTRACT

A powered respirator is provided with a device sensitive to the pressure within the respirator in the region of the user's face and adapted to sound a warning in the event that the sensed pressure goes below a selected threshold value. The device includes a flexible diaphragm exposed on its opposite sides to the sensed and atmospheric pressures respectively, and an infra red emitter and receiver arranged so that the level of energy received by the receiver from the emitter depends upon the flexural position of the diaphragm. In different embodiments the diaphragm may be arranged to reflect the radiation from the emitter onto the receiver or not, or to interrupt a beam of radiation from the emitter to the receiver or not, depending on the pressure differential across it. In either case, when a sufficient energy level is detected at the receiver, indicating a pressure level below the selected threshold, power is switched to a sounder to warn the user of the low pressure condition.

7 Claims, 2 Drawing Sheets

POWERED RESPIRATORS

BACKGROUND

The present invention relates to powered respirators, by which is meant respirators of the kind where a pump provides a forced flow of filtered air to the face of the wearer to ensure (in normal operation) that he has an adequate supply of clean breathable air when worn in a dusty or otherwise contaminated environment—for example as described in United Kingdom patent specification no. 1495020 and of which examples are marketed by the assignee of the present application under the trade marks AIRSTREAM and JUPITER. Such respirators are generally arranged to deliver air at a sufficient rate to maintain a slight positive pressure in the region of the user's face throughout the breathing cycle, so that there can be no inward leakage of contaminated air from the surrounding environment. However, circumstances can sometimes arise in which this pressure will not be maintained at a superatmospheric level during inhalation—with a consequent danger of contaminants being breathed in—for example if the user is breathing at an exceptionally high rate or if the airflow is reduced due to filter blockage or battery exhaustion. In such circumstances it is desirable to provide some means of warning the user that the supply pressure is approaching a negative condition in order that he can take appropriate corrective action.

In the past attempts to devise such warning devices for powered respirators have generally been based on monitoring the rate of flow of air delivered by the pump, rather than by monitoring the actual pressure within the user's visor or mask. However, flow measurement is difficult and expensive and in any event may not give a true indication that the pressure as supplied to the user has fallen below a safe level, e.g. if the user is breathing particularly hard or if air from the pump is being dumped to the atmosphere through an ill-fitting or raised visor. It is recognised, therefore, that there is a need for a device which is capable of monitoring the pressure within the visor or mask of a powered respirator and of responding to even slight departures of that pressure below a selected level.

In United Kingdom patent specification no. 2130893 there is disclosed a performance monitor for a powered respirator helmet in the form of a float-type pressure gauge mounted inside the visor of the helmet and comprising a ball which changes its position along the length of a transparent tube in dependence upon the pressure within the visor. Such a gauge is, however, extremely difficult for the user to monitor effectively at anything other than odd intervals as he must adjust his field and focus of view specifically to the gauge in order to accurately assess the position of the ball at any time; indeed, the presence of this gauge may act as an unwelcome distraction to the user. The normal head movements of the user may also disturb the position of the ball. It is furthermore impossible for this kind of monitor to give an audible warning to the user in the event of a pressure reduction below a selected level, which form of warning is much to be preferred as the most practical way of drawing his attention to this potentially hazardous situation.

SUMMARY OF THE INVENTION

The present invention accordingly seeks to provide an improved form of pressure monitoring for a powered respirator with a view to warning the user in the event that a selected pressure level is not being reached, and resides in a powered respirator incorporating a differential pressure sensor comprising a flexible diaphragm or other like pressure-responsive member (e.g. bellows) arranged to be exposed on its opposite sides to the pressure within the respirator in the region of the user's face and to a reference pressure respectively, and adapted to flex in response to change in the differential between said pressures; an emitter and a receiver of selected electromagnetic radiation mounted in relation to said pressure-responsive member such that the level of radiation received from the emitter by the receiver is dependent upon the flexural position adopted by that member; and means connected to the receiver to provide an electrical warning signal in the event that the said radiation received by the receiver is at a level which corresponds to a position of the pressure-responsive member which obtains when the pressure in the region of the user's face is below a predetermined value in relation to said reference pressure. The reference pressure will normally be atmospheric pressure and the predetermined value below which the warning signal is provided will normally be a value slightly above atmospheric.

Most preferably the aforesaid warning signal is used to drive an audible warning device mounted on the respirator, although it is within the scope of the invention for other means to be employed for transducing this signal and warning the user, e.g. a lamp mounted within his general field of view which will be illuminated if the said pressure is below the predetermined value.

The arrangement of the said pressure-responsive member, emitter and receiver may be such that the pressure-responsive member interrupts or not a beam of radiation (e.g. infra red light) transmitted directly from the emitter to the receiver, in dependence upon its flexural position. In a preferred embodiment, however, the emitter and receiver are located in a generally parallel disposition and facing one side of the diaphragm or the like which accordingly flexes towards and away from the emitter/receiver pair in accordance with the pressure differential across it; when spaced a sufficient distance away from the emitter/receiver the surface of the pressure-responsive member will reflect or scatter the infra red or other radiation from the emitter onto the receiver but at closer spacings it will effectively mask the emitter from the receiver.

It will be noted that in a sensor of the kind incorporated within the invention, the position of the pressure-responsive member is monitored by means which impose no mechanical load upon it. The diaphragm or the like can accordingly exhibit a high degree of sensitivity to changes in the pressure differential across it. By way of example, the sensors in the preferred embodiments of warning device to be described herein are capable of responding to initiate a warning signal to a change of as little as 2 Pascals in a differential of, say, 20 Pascals.

BRIEF DESCRIPTION OF THE DRAWINGS

The invention will now be more particularly described, by way of example, with reference to the accompanying drawings, in which.

DESCRIPTION OF THE INVENTION

Figure 1:
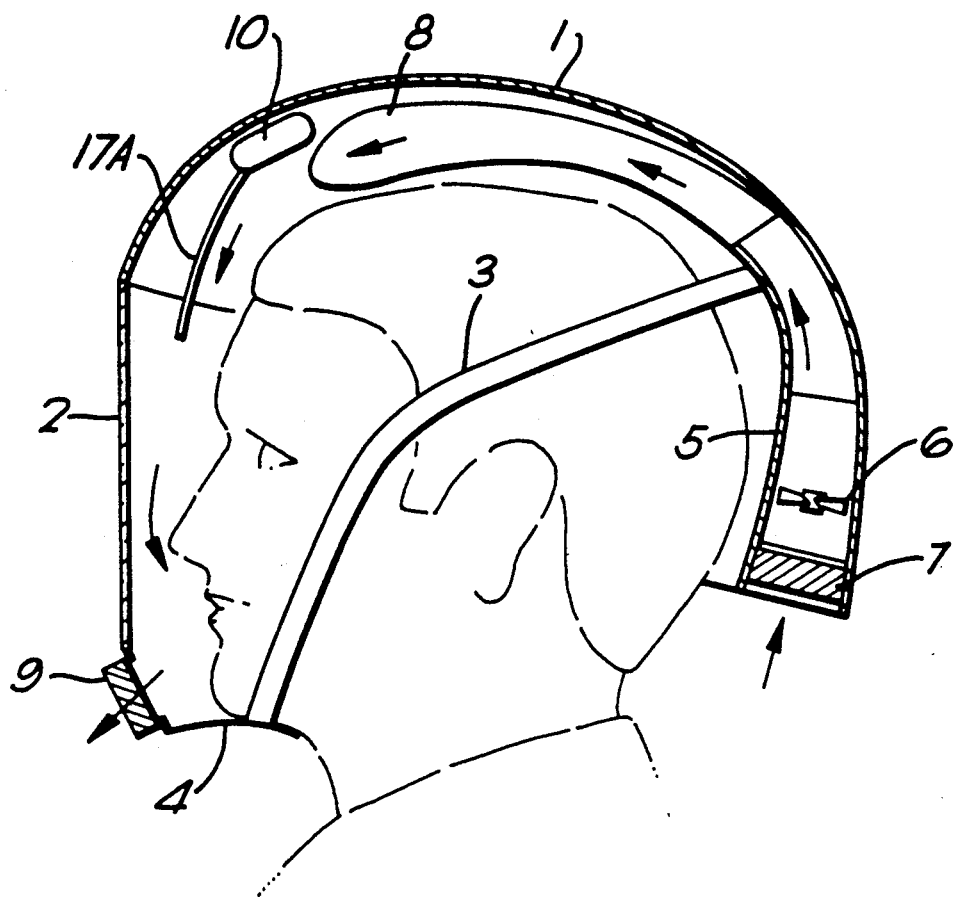
FIG. 1 is a schematic sectional view through a typical powered respirator to which the invention is applied.

Referring to FIG. 1, there is shown a powered respirator helmet of generally known kind comprising a shell 1 which extends over the top, rear and upper sides of the head and is provided inwardly with a supporting harness (not shown) by which it bears on the wearer's head. At the front the helmet is closed by a transparent visor 2, and a seal 3 is provided to close the gap between the shell 1 and the rear and sides of the wearer's head. The lower edge of the visor 2 is closed by a flexible membrane 4 bearing against the wearer's chin. At the rear, a housing 5 is provided in which a fan 6 is driven by a DC electric motor, powered from a remote (e.g. belt-mounted) battery pack (not shown). The fan draws air in through the lower open end of the housing 5 through a first-stage filter 7 and pumps the air through a main bag filter 8 located over the top of the wearer's head, and thence across his face to supply a continuous flow of clean breathable air for the wearer. His exhalate and excess supplied air exhausts through a one-way valve 9 at the lower end of the visor 2.

In normal operation, the throughput of the fan 6 is intended to be sufficient to maintain a slight positive pressure in the region of the wearer's face to ensure that there is no inward leakage of contaminated air from the surrounding environment. However, as previously indicated, in some circumstances this level of pressure might not always be maintained and therefore in accordance with the invention a device to warn of the onset of undesirably low pressure conditions is incorporated in the respirator, being mounted to the interior of the shell 1 where schematically indicated at 10 in FIG. 1. The device 10 comprises a differential pressure sensor with an associated electronic circuit and audible warning sounder and a preferred embodiment of this device will now be described with reference to FIG. 2.

Figure 2:
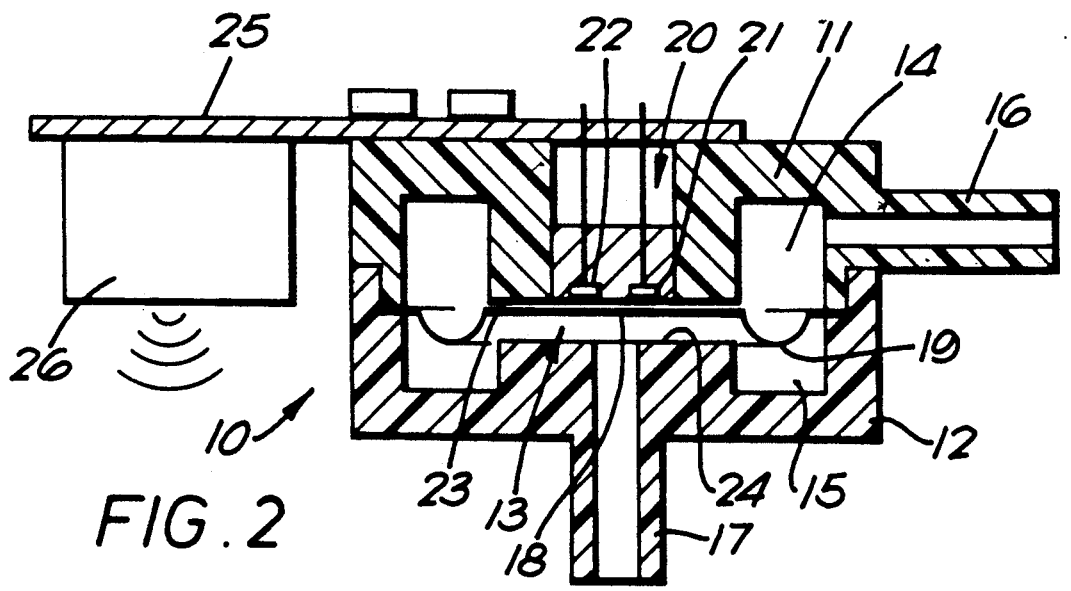
FIG. 2 is a sectional view through one embodiment of a differential pressure sensor as incorporated in a low-pressure warning device for the respirator of FIG. 1.

Referring to FIG. 2, the illustrated sensor comprises two moulded-plastics housing parts 11 and 12 mating around their marginal edges and clamping between them the periphery of a thin elastomeric diaphragm 13. The diaphragm thus separates two chambers 14 and 15 within the housing, each having a nipple 16, 17 for connection to a respective source of pressure. The diaphragm 13 is of the kind having a central circular disc portion 18 which is joined to its peripheral portion through a thinner annular corrugation 19 which provides the operative flexibility of the diaphragm. In response to changing differential pressures in the chambers 14 and 15, therefore, the central portion 18 of the diaphragm moves up and down (in the sense as viewed in the Figure) by flexure of the corrugated portion 19, while remaining substantially perpendicular to its axis.

Mounted in a central well of the housing part 11 is an infra red emitter/receiver unit 20. This comprises an infra red light emitting diode (LED) 21 and photo-transistor receiver 22 located side by side and facing towards the central portion 18 of the diaphragm 13. Units of this kind are known for use in tape recorders for sensing reflective end-of-tape markers and an example is the Honeywell HOA 1397/2. In operation, the LED 21 emits infra-red radiation towards the diaphragm 13 and the relative position of the latter is monitored by detection of the light energy reflected back from the diaphragm onto phototransistor 22.

More particularly, when the pressure in chamber 15 exceeds that in chamber 14 the diaphragm 13 is urged towards the housing part 11 and when a sufficient differential prevails its central portion 18 will lie against the end face 23 of that part. In this position the diaphragm closely overlies the unit 20 and masks the LED 21 from the phototransistor 22. When the pressure differential is reduced below a selected level, however, the diaphragm will resile from the unit 20 and ultimately a reversal of the pressure differential would urge it in the opposite direction to lie against the end face 24 of the housing part 12. When the diaphragm moves away from the unit 20 through a sufficient distance light energy from the LED 21 is reflected or scattered by the surface of the diaphragm so that at least a proportion thereof is received by the phototransistor 22. This leads to a change in the resistance of the latter which can be detected by a suitable circuit mounted on a board 25, as will be more fully described hereinafter. The degree of reflectance of infra red radiation by the diaphragm 13 depends inter alia on its pigmentation, a dark grey silicone rubber having been found to work well with an emitter/receiver unit 20 as exemplified above. There is, in particular, no need for a "mirrored" surface coating on the diaphragm.

As incorporated in the respirator of FIG. 1, the chamber 14 of this sensor is connected through the shell 1 to the external atmospheric pressure and the chamber 15 is tapped in to the internal pressure within the visor region through a suitable length of small-bore tubing 17A (FIG. 1). While the latter pressure is maintained at or above a selected superatmospheric level—say 20 Pascals positive pressure in a particular example—the diaphragm 13 will remain in its upper position (in the sense of FIG. 2), against the face 23, and no light from the emitter 21 will be received by the phototransistor 22. If, however, the visor pressure should at any time fall below the selected level by as little as, say, 2 Pascals in the same example, the diaphragm will move away from this position to permit reflection/scattering of light from the emitter 21 to the receiver 22. This will be signalled by an electromagnetic sounder 26 under the control of the detection circuit to warn the user that unsafe operating pressure conditions are approaching.

Figure 3:
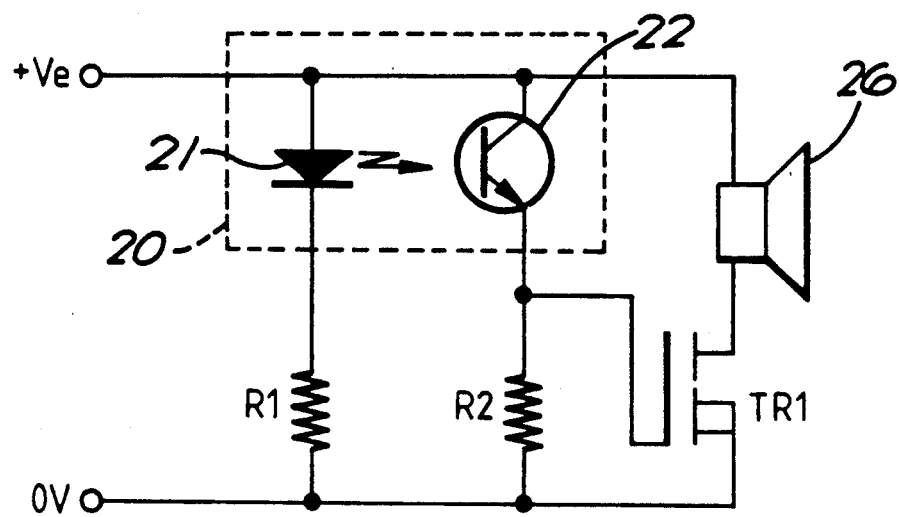
FIG. 3 shows the circuit diagram for the warning device.

The detection circuit is shown in FIG. 3. It may be powered from the same battery pack as the motor for fan 16 or, more preferably, has its own battery making the warning device a completely self-contained unit. Resistor R1 is a current limiting resistor for the LED 21 and resistor R2 forms a potential divider with the phototransistor 22, connected to the base of a MOSFET TR1. While the sensed pressure differential is above the selected threshold and the phototransistor 22 receives no infra red energy the resistance of the latter is extremely high and the MOSFET accordingly blocks power to the sounder 26. If the sensed pressure differential goes below the selected threshold, however, so that sufficient energy from the LED 21 is received by the phototransistor 22, the latter conducts sufficiently to switch the MOSFET and the sounder 26 (which has its own internal oscillator) is accordingly operated.

If it is wished for the illustrated device 10 to respond at a higher elevated threshold in relation to atmospheric pressure appropriate spring biasing may be applied to the diaphragm 13. Variation in the pressure differential to which devices as illustrated respond can also be achieved using the same housing components but by selecting different diaphragms 13 of different inherent stiffnesses.

The illustrated form of the housing components 1 and 2 provides protection for the diaphragm 3 against overstressing if subjected to an excessive pressure differential in either sense, by supporting the central part of the diaphragm on the faces 23 and 24 at the opposite ends of its travel.

Figure 4:
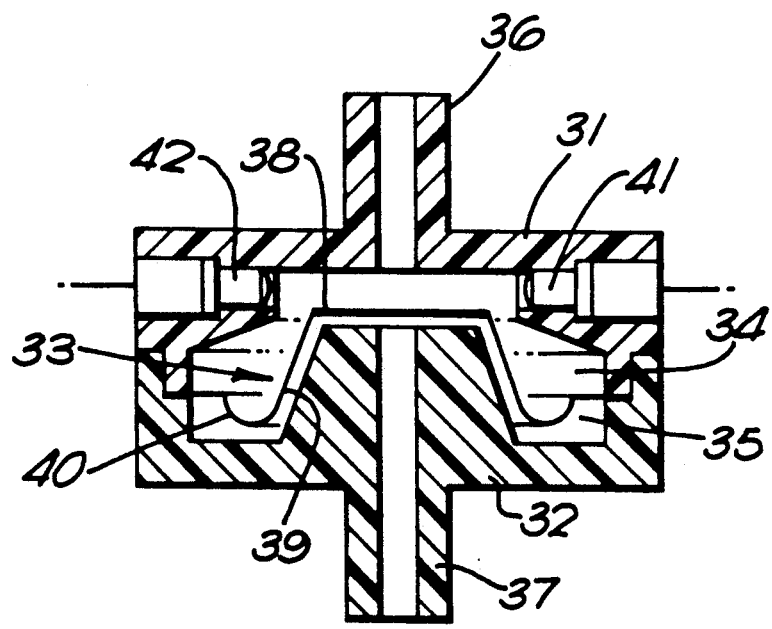
FIG. 4 is a sectional view through an alternative embodiment of pressure sensor for use in the invention.

Turning now to FIG. 4, this shows a second embodiment of a differential pressure sensor which may be used for the same service as the sensor shown in FIG. 2. It comprises two moulded-plastics housing parts 31 and 32 mating around their marginal edges and clamping between them the periphery of a thin elastomeric diaphragm 33. The diaphragm thus separates two chambers 34 and 35 within the housing, each having a nipple 36, 37 for connection to a respective source of pressure. The diaphragm in this case is of "top hat" section having a central circular disc portion 38 which is joined to its peripheral portion through a frusto-conical portion 39 and an annular corrugation 40 which provides the operative flexibility of the diaphragm. In response to changing differential pressures in the chambers 34 and 35, therefore, the central portion 38 of the diaphragm moves up and down (in the sense as viewed in the Figure) by flexure of the corrugated portion 40, while remaining substantially perpendicular to its axis.

Mounted in the housing part 31 and facing each other across the chamber 34 are an infra red light emitting diode (LED) 41 and a phototransistor receiver 42. In operation, the LED 41 emits a beam of infra-red radiation towards the phototransistor 42, perpendicular to the direction of movement of the diaphragm 33, and the relative position of the latter is monitored by detection of the light energy received from the LED by the phototransistor.

More particularly, the height of the central portion of the diaphragm 33 within the housing at any time depends upon the extent to which the pressure within the chamber 35 exceeds that within the chamber 34. As the diaphragm moves up it interrupts the infra red beam passing between the LED 41 and phototransistor 42 and as it resiles from its upper position it permits the reception of the beam by the phototransistor. With the chamber 34 connected to atmospheric pressure and the chamber 35 tapped in to the pressure in the visor region of the respirator, therefore, this sensor can be used with the circuit of FIG. 3 (where 41 replaces 21 and 42 replaces 22) to signal pressure conditions below a predetermined threshold value in the same way as described above for the FIG. 2 embodiment.

I claim:

1. A powered respirator incorporating a differential pressure sensor comprising a flexible pressure-responsive member arranged to be exposed on its opposite sides to the pressure within the respirator in the region of a user's face and to a references pressure respectively, and adapted to flex in response to change in the differential between said pressures; an emitter and a receiver of selected electromagnetic radiation located side by side and facing towards one side of said pressure-responsive member whereby said member flexes towards or away from the emitter and receiver in dependence upon the pressure differential across it; in a first spacing of said member from the emitter and receiver said radiation being transmitted from the emitter to the receiver via the surface of said one side of said member and in a second spacing of said member from the emitter and receiver such transmission of radiation from the emitter to the receiver being prevented; said member changing from one of said first or second spacings to the other of said first or second spacings when the pressure in said region falls below a predetermined value in relation to said reference pressure; and means connected to said receiver to provide an electrical warning signal in response to the change of said member from said one to said other of its spacings.

2. The respirator of claim 1 wherein said reference pressure is atmospheric pressure and said predetermined value is a chosen superatmospheric pressure.

3. The respirator of claim 1 comprising an audible warning device mounted thereon and adapted to be driven from said warning signal.

4. The respirator of claim 1 wherein said pressure-responsive member is in the form of a diaphragm having a disc-like central portion which is jointed to a fixed peripheral portion of the diaphragm through an annular corrugated portion which provides the operative flexibility of the diaphragm whereby in response to change in the differential pressure across the diaphragm said central portion moves relative to said peripheral portion along the axis of the diaphragm while remaining substantially perpendicular to said axis.

5. The respirator of claim 1 wherein said pressure-responsive member is in the form of a diaphragm having a disc-like central portion which is jointed to a fixed peripheral portion of the diaphragm through an annular corrugated portion which provides the operative flexibility of the diaphragm, whereby in response to change in the differential pressure across the diaphragm said central portion moves relative to said peripheral portion along the axis of the diaphragm while remaining substantially perpendicular to said axis.

6. The respirator of claim 5 wherein said diaphragm is mounted in a housing which presents opposed flat surfaces against which said central portion of the diaphragm can lie to limit its extent of travel in either sense.

7. A powered respirator comprising a structure adapted to be worn on the user's head and to define, when worn, a confined space in the region of the user's face; means for providing a forced flow of air to said space for respiration by the user; and means for filtering said flow of air; the respirator incorporating a differential pressure sensor comprising a flexible pressure-responsive member arranged to be exposed on its opposite sides to the pressure within said space and to a reference pressure respectively, and adapted to flex in response to change in the differential between said pressures; an emitter and a receiver of selected electromagnetic radiation located side by side and facing towards one side of said pressure-responsive member whereby said member flexes towards or away from the emitter and receiver in dependence upon the pressure differential across it; and means connected to the receiver to provide an electrical warning signal in the event that the pressure-responsive member is spaced from the emitter and receiver such as to permit the transmission of said radiation from the emitter to the receiver via the surface of said one side of that member, which spacing obtains when the pressure in said space is below a predetermined value in relation to said reference pressure.

* * * * *